Jan. 17, 1967  D. B. MILLIKEN  3,298,582
CAMERA FILM FEED HAVING A DETENT MEANS
Filed May 14, 1963  3 Sheets-Sheet 1

DONALD B. MILLIKEN
INVENTOR.
KENDRICK AND STOLZY
BY Donald Stolzy
ATTORNEYS

Jan. 17, 1967  D. B. MILLIKEN  3,298,582
CAMERA FILM FEED HAVING A DETENT MEANS
Filed May 14, 1963  3 Sheets-Sheet 2

DONALD B. MILLIKEN
INVENTOR.
KENDRICK AND STOLZY
BY
ATTORNEYS

DONALD B. MILLIKEN
INVENTOR.
KENDRICK AND STOLZY
BY
ATTORNEYS

United States Patent Office 3,298,582
Patented Jan. 17, 1967

3,298,582
FILM FEED CAMERA HAVING A DETENT MEANS
Donald B. Milliken, Altadena, Calif., granted to National Aeronautics and Space Administration under the provisions of 42 U.S.C. 2457(d)
Filed May 14, 1963, Ser. No. 280,362
1 Claim. (Cl. 226—58)

This invention relates to mechanisms for transporting motion picture film, and more particularly to apparatus for holding such film securely in a camera gate at all times except when such film is intentionally being moved to the next frame position by the film transporting mechanism.

The apparatus of the present invention will have a great many applications other than those specifically described herein and the invention should therefore not be limited thereto for this reason. However, the invention has been found to possess unusual utility in cameras that are used in environments in which they are subjected to severe vibration or high loads due to acceleration.

In the past, motion picture cameras have often been known to fail while being subject to vibration. It is not uncommon for "frames" of a film to "jump" when the film is shown after it has been exposed in a camera that was subjected to vibration during such exposure.

Another disadvantage of the prior art relates to the operation of a conventional pitman type shuttle which is projected through film sprocket holes and successively withdrawn therefrom after the film has been moved lengthwise thereby a distance equal to that between each pair of adjacent sprocket holes. If a camera incorporating such a shuttle is subjected to rough treatment, the film may shift in the gate while the shuttle is disengaged. The shuttle will then puncture the film on its next engagement and the camera will jam.

The present invention overcomes the above-described and other disadvantages of the prior art by providing a gate having means to guide motion picture film longitudinally therethrough and detent means to hold the film in a substantially fixed longitudinal position in said gate. Further, the same means thus acts as means to register each frame of the film with the camera aperture so that pictures will not "jump" when exposed and developed film is shown. Further, when the device of the present invention is employed with a shuttle to support film longitudinally in a camera, the device of the present invention in that case prevents the shuttle tip from puncturing the film because the latter is fixed in the proper longitudinal position in the camera except when the shuttle is engaged.

The above described and other advantages of the present invention will be better understood from the following description when considered in connection with the accompanying drawings.

In the drawings which are to be regarded as merely illustrative:

Figure 1:
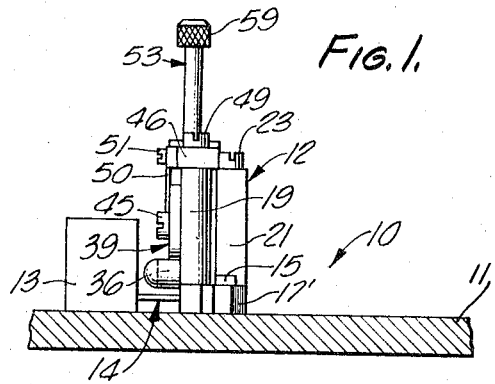
FIG. 1 is a side elevational view partly in section of a film gate, shuttle and shuttle drive means which may be employed in accordance with the present invention.

A portion 10 of camera having a case 11 is shown in FIG. 1 having a film gate 12 and a shuttle drive 13 fixed thereto. A connection exists between shuttle drive 13 and gate 12 including a shuttle 14. Gate 12 is bolted to camera case 11 by bolts 15 which extend through bolt holes 16 in ears 17' on a base 17 of gate 12 as shown in FIG. 7.

Figure 6:
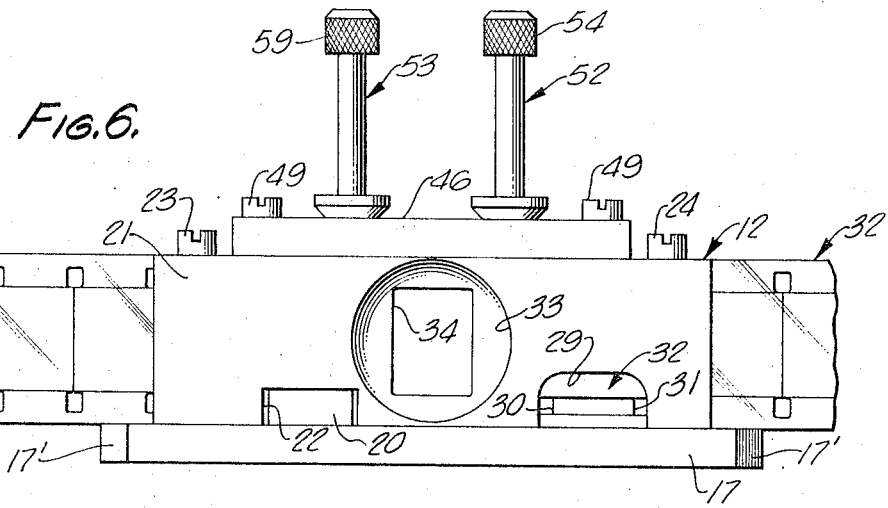
FIG. 6 is a front elevational view of the gate shown in FIG. 3.

As shown in FIG. 1, gate base 17 has a gate side 19 integral therewith. A rectangular portion 20 is fixed to base 17 by screws 27 and 28 extending through base 17 which are threaded into portion 20. Portion 20 projects through and is flush with the righthand surface of a gate side 21 as shown in FIGS. 1 and 6. Gate side 21 has a rectangular notch 22 cut therein for that purpose, that is, to receive portion 20.

Figure 7:
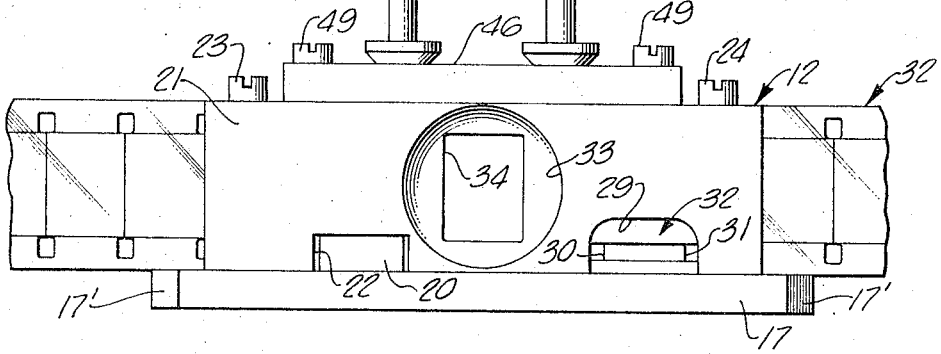
FIG. 7 is a bottom plan view of the gate shown in FIG. 3.

A gate side 21 is held in a fixed position on gate base 17 by means of a pair of bolts 23 and 24 which extend through gate side 21 and are threaded into base 17 at holes 25 and 26, respectively, shown in FIG. 7.

Gate side 21 is provided with a notch 29 into which shuttle 14 projects when it extends through sprocket holes 30 and 31 in film 32 which is guided longitudinally through gate 12.

Notch 29 is shown in FIG. 6. Also as shown in FIG. 6, gate side 21 is provided with a recess 33 that has a rectangular hole 34 cut entirely therethrough to provide the camera aperture. The field of view of the camera is focused through aperture 34 onto each frame of film 32 in succession.

Figure 3:
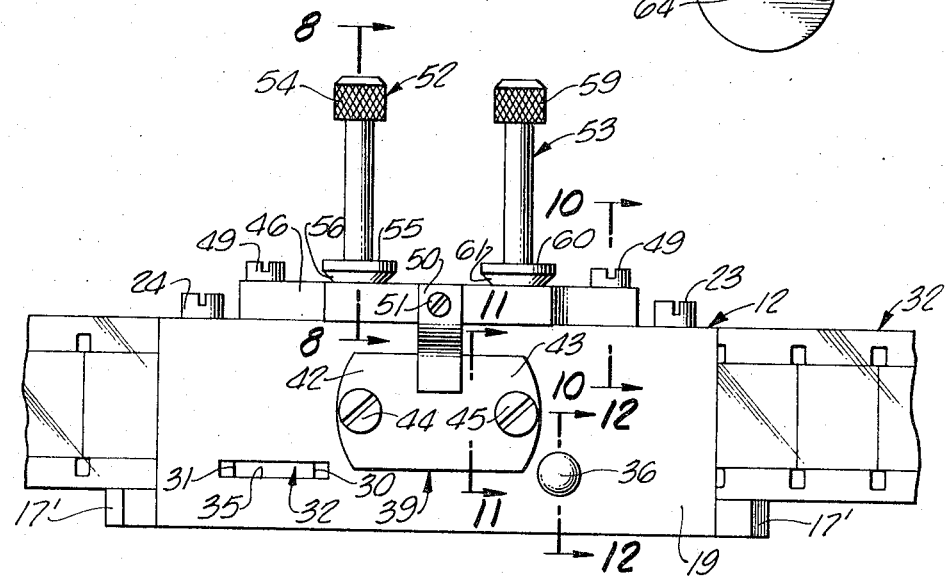
FIG. 3 is a rear elevational view of the film gate shown in FIG. 1.
Figure 4:
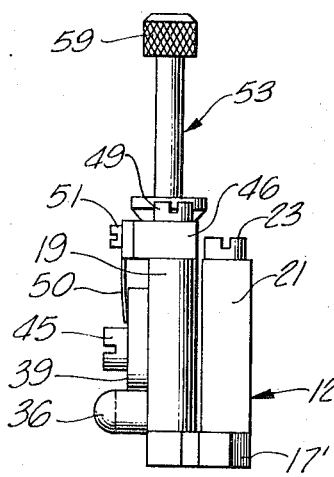
FIG. 4 is a side elevational view of the film gate shown in FIG. 3.
Figure 5:
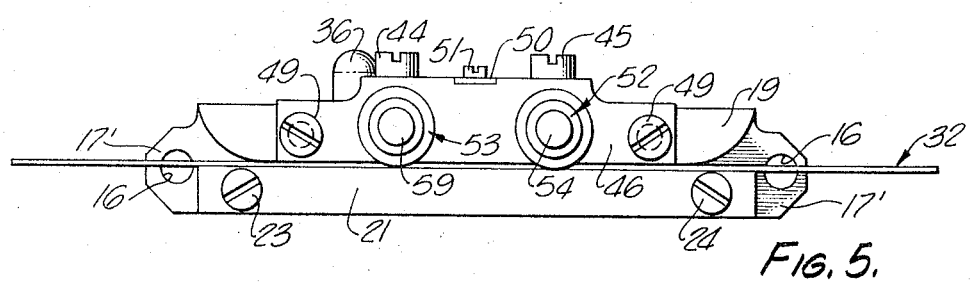
FIG. 5 is a top plan view of the gate shown in FIG. 3.
Figure 11:
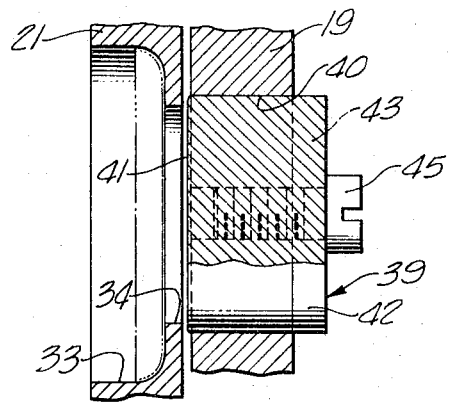
FIG. 11 is a sectional view of a portion of the gate taken on the line 11—11 shown in FIG. 3.
Figure 12:
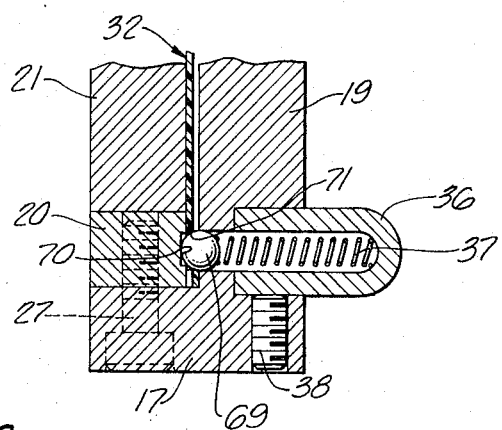
FIG. 12 is a sectional view of a portion of the gate taken on the line 12—12 shown in FIG. 3.

Shuttle 14 also projects through a rectangular slot 35 in gate side 19, as shown in FIG. 3. Also as shown in FIG. 3, gate side 19 is provided with a spring housing 36 which is placed thereinto to house a spring 37 shown in FIG. 12. Housing 36 is maintained in a fixed position in base 17 by means of a set screw 38 shown in both FIGS. 7 and 12. A block 39 projects through a cylindrical bore 40 in gate side 19 to present a surface 41 to locate film 32 in an appropriate position contiguous to aperture 34 in recess 33 of gate side 21 as shown in FIG. 11.

As shown in FIG. 3, block 39 is provided with ears at 42 and 43 through which bolts 44 and 45 project and are threaded into gate side 19.

Figure 8:
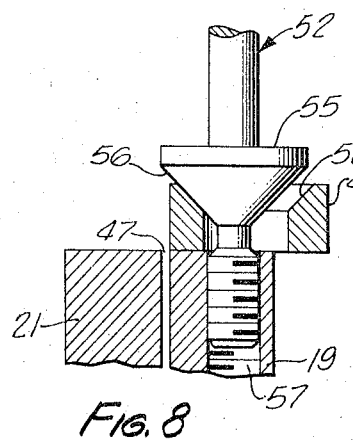
FIG. 8 is a sectional view of a portion of the gate taken on the line 8—8 shown in FIG. 3.
Figure 9:
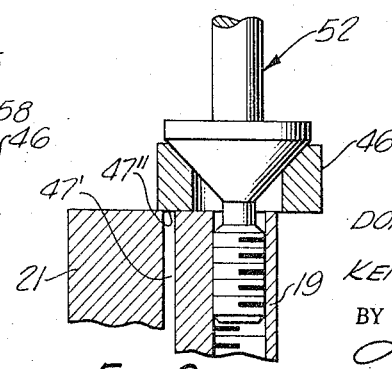
FIG. 9 is a sectional view similar to the sectional view of FIG. 8 with the gate of FIG. 3 closed, FIG. 8 being a sectional view of the gate in FIG. 3 with the same being open.
Figure 10:
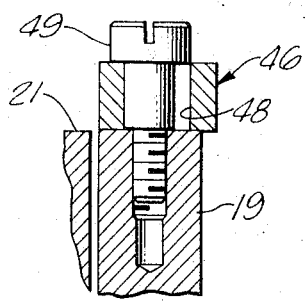
FIG. 10 is a sectional view of a portion of the gate taken on the line 10—10 shown in FIG. 3.

A rail guide 46 is slidable on gate side 19 from a position shown in FIG. 8 to a position shown in FIG. 9. Note will be taken that in FIG. 8, the space between gate side 19 and gate side 21 at 47 is left clear whereby film may be loaded into and removed from gate 12. When rail guide 46 is moved to the position shown in FIG. 9, this space is closed and film 32 cannot rise outwardly of the space between gate sides 19 and 21.

Rail guide 46 is slidable on the top of both gate sides 19 and 21. Slots 48 are provided therein through which guide screws 49 project. A leaf spring 50 urges rail guide 46 to the position shown in FIG. 8, leaf spring 50 being fixed to rail guide 46 by means of a screw 51. The lower end of leaf spring 50, as shown in FIG. 3, bears against block 39.

Rail guide 46 is moved from the position shown in FIG. 8 to the position shown in FIG. 9 when spindles 52 and 43 are screwed into gate side 19. Note will be taken that the upper opening of space 47' between gate sides 19 and 21 is closed by portion 47" of guide rail 46 as shown in FIG. 9. Note will be taken that spindle 52 is provided with a knurled end 59 and a projection 60 having a frusto conical surface 61. The threaded connection of spindle 53 with gate side 19 is identical to that of spindle 52 therewith. The detail of this thread is therefore not shown.

Figure 2:
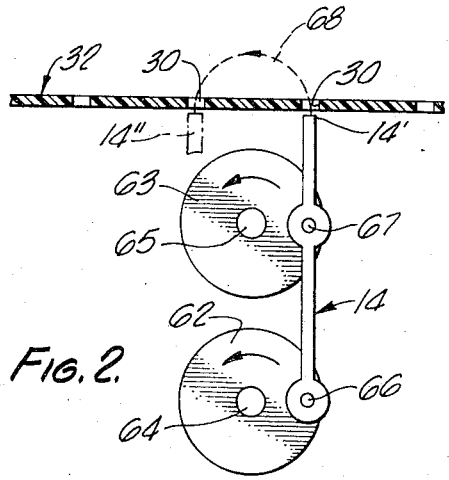
FIG. 2 is a diagrammatic view illustrating the motion of a shuttle and shuttle tip in a conventional camera.

As shown in FIG. 2, shuttle 14 may be a pitman type actuator for moving film 32 intermittently a distance equal to that between adjacent sprocket holes 30 and 31. This function is performed for each revolution of a pair of identical cranks 62 and 63 which are fixed to identical shafts 64 and 65, respectively, that rotate at identical speeds. Note will be taken that shuttle 14 is pinned at 66 and 67 to cranks 62 and 63, respectively, and that these pins rotate relative to shuttle 14. Shuttle 14 thus always remains in the plane of the paper of the drawing of FIG. 2 parallel to a plane through the axes of shafts 64 and 65. In operation, shuttle 14 enters sprocket hole 30. The tip 14' of shuttle 14 then moves as indicated by dotted line 68 to a position outside of the sprocket holes as indicated in dotted lines at 14". The motion of shuttle 14, as shown in FIG. 2, is conventional in a motion picture camera for transporting film intermittently.

It is an outstanding feature of the present invention that film 32 is held in a fixed longitudinal position between gate sides 19 and 21 at all times that shuttle tip 14 is disengaged from sprocket hole 30 in film 32. Yet, it is possible to load gate 12 and unload the same with film 32. All of these functions are made possible by a spherical ball detent 69 which is urged into recess 70 in gate portion 20.

Ball detent 69 is located in longitudinal alignment with sprocket holes 30 and 31. Ball detent 69 enters each successive sprocket hole and is of a size such that the same bears against a sprocket hole edge at 71 and causes the film to dimple slightly. Ball detent 69 thus holds edges of film 32 immediately surrounding each sprocket hole against gate portion 20 surrounding recess 70 therein.

From the foregoing, it will be appreciated that at no time is film 32 permitted any uncontrolled movement in gate 12, due to the fact that the times of actuation of the film transporting means and the film holding and registering means overlap. This therefore not only registers each frame of film 32, but it also prevents the tip of shuttle 14 from puncturing film 32.

Still further, note will be taken that although the invention has the aforesaid advantages, the film may be loaded into or removed from the gate 12 easily and quickly. Ball detent 69, in a manner of speaking, is self-actuating due to the action of spring 37. The application of a longitudinal force on film 32 simply drives ball detent 69 out of each successive sprocket hole in the film.

For clarity, some of the component parts of the invention have been left out in some of the figures. Thus, camera case 11 is shown only in FIG. 1. Shuttle drive 13 is shown only in FIGS. 1 and 2. Shuttle 14 is also shown only in FIGS. 1 and 2. Film 32 is shown only in FIGS. 2, 3, 5, 6, 7 and 12. Bolt 15 is shown only in FIG. 1.

Although only a few embodiments of the present invention have been described and illustrated herein, many changes and modifications thereof will of course suggest themselves to those skilled in the art. The present invention should therefore not be limited to the embodiments selected for this disclosure, the true scope of the invention being defined only in the appended claims.

What is claimed is:

In a camera, the combination comprising: a gate having a rectangular slot to guide motion picture film longitudinally therethrough; a pitman type shuttle having a tip to extend into each of a series of sprocket holes in said film to advance said film intermittently by a distance equal to that between adjacent sprocket holes; drive means to move said shuttle into and out of each successive sprocket hole, said gate slot having a recess in one wall thereof in longitudinal alignment with said sprocket holes, said recess being positioned to lie in registry with a sprocket hole when said film is stationary; a ball detent; guide means for said ball detent to hold it in alignment with said recess; and spring means to urge said ball detent into said recess, said ball detent being of a size sufficiently large to hold said film in frictional engagement with a side of said gate slot immediately surrounding said recess when a sprocket hole lies in registry therewith.

References Cited by the Examiner

UNITED STATES PATENTS

| | | | |
|---|---|---|---|
| 1,631,570 | 6/1927 | Amet | 226—58 |
| 1,984,143 | 12/1934 | Kraft | 226—58 |
| 2,788,703 | 4/1957 | Holman | 226—58 |
| 3,058,637 | 10/1962 | Gerlach | 226—58 |
| 3,061,160 | 10/1962 | Elsas | 226—58 |

M. HENSON WOOD, JR., *Primary Examiner.*

A. N. KNOWLES, *Assistant Examiner.*